US 6,545,591 B2

(12) United States Patent
Hooks et al.

(10) Patent No.: US 6,545,591 B2
(45) Date of Patent: Apr. 8, 2003

(54) APPARATUS FOR PROVIDING POWER TO A VISUAL MESSAGING SYSTEM FOR HIGH-SPEED NETWORKS

(75) Inventors: Kevin Hooks, McKinney, TX (US); Chuck Odom, Sugar Land, TX (US)

(73) Assignee: Symon Communications, Inc., Sugar Land, TX (US)

( * ) Notice: Subject to any disclaimer, the term of this patent is extended or adjusted under 35 U.S.C. 154(b) by 0 days.

(21) Appl. No.: 09/939,101

(22) Filed: Aug. 24, 2001

(65) Prior Publication Data

US 2002/0041227 A1 Apr. 11, 2002

Related U.S. Application Data

(63) Continuation-in-part of application No. 09/247,370, filed on Feb. 10, 1999, now Pat. No. 6,294,982.

(51) Int. Cl.[7] .................................................. G08B 9/00
(52) U.S. Cl. ............... 340/286.02; 340/660; 340/693.1; 363/15; 363/34
(58) Field of Search ................................ 340/660, 664, 340/693.1, 286.2; 363/15, 34

(56) References Cited

U.S. PATENT DOCUMENTS

| | | | |
|---|---|---|---|
| 4,639,714 A | * 1/1987 | Crowe | 340/310.01 |
| 4,825,201 A | 4/1989 | Watanabe et al. | 340/717 |
| 5,136,695 A | 8/1992 | Goldshlag et al. | 395/275 |
| 5,347,384 A | 9/1994 | McReynolds et al. | 359/118 |
| 5,469,534 A | 11/1995 | Brindle et al. | 395/114 |
| 5,523,769 A | 6/1996 | Lauer et al. | 345/1 |
| 5,530,844 A | 6/1996 | Phillips et al. | 395/500 |
| 5,654,748 A | 8/1997 | Matthews, III | 348/13 |
| 5,790,792 A | 8/1998 | Dudgeon et al. | 395/200.42 |
| 5,796,376 A | 8/1998 | Banks | 345/82 |
| 5,847,948 A | * 12/1998 | Gatto et al. | 363/65 |
| 5,884,202 A | 3/1999 | Arjomand | 701/29 |

OTHER PUBLICATIONS

Am79C960 PCnet–ISA Technical Manual; Advanced Micro Devices, May 1992.
Project Highlights, Bay Area Rapid Transit, "BART Passengers to be Informed by New Daktronics Signs", Daktronics, Inc., 1996 (SL 090401–3173).
Internet article entitled: "Internet Connectivity: Stacking the Odds in Your Favor"; Author: Jack G. Ganssle, Embedded-Systems Programming, Embedded.com, (http://www.embedded.com/98/9801fe.htm).

* cited by examiner

Primary Examiner—Julie Lieu
(74) Attorney, Agent, or Firm—Madan, Mossman & Sriram, P.C.

(57) ABSTRACT

The present invention provides a visual messaging device for use with a high-speed network and an electrical supply system for the visual messaging device. The visual messaging device includes a network interface circuit that receives the message data from a network and arranges it in memory unit in usable form (packets) for use by a processor at the high network speed. The electrical supply system utilized with the visual messaging device comprises, in part, a power source, located in a remote location relative to a low voltage, high current device, which provides for the transmission of electrical power to the low voltage, high current device, such as a visual display unit, via relatively thin wiring or cabling passing through an enclosure, such as a plenum air space, without the need of placing the wiring or cabling in a conduit.

12 Claims, 4 Drawing Sheets

APPARATUS FOR PROVIDING POWER TO A VISUAL MESSAGING SYSTEM FOR HIGH-SPEED NETWORKS

CROSS-REFERENCE TO CORRESPONDING APPLICATION

This application is a continuation-in-part of U.S. patent application Ser. No. 09/247,370, filed Feb. 10, 1999 now U.S. Pat. No. 6,294,982.

BACKGROUND OF THE INVENTION

1. Field of the Invention

This invention relates generally to electronic visual display systems and more particularly to a real-time visual messaging device for displaying messages received via high-speed networks from remote sources. In another aspect, the present invention relates to devices that provide power to visual display systems and more particularly to a remote power system for visual messaging device electrical components, preferably high current devices, including visual display units.

2. Description of the Related Art

Visual messaging devices are commonly used to display visual messages in the form of words, letters and figures. Such devices include a display unit that usually includes a matrix of illuminating elements, such as light-emitting diodes ("LEDs"). Messages are communicated or transmitted from remote devices such as computers or servers over high-speed networks such as local area networks ("LANs"), wide area networks, the Internet and the like.

In a large number of applications, such as manufacturing facilities, entertainment and other areas, it is very desirable to display the visual messages substantially in real time. The commonly used remote units transmit messages in the form of digital data at relatively high data rate (large bandwidth), typically in excess of one (1) megabits per second. Message information when used at the transmitted rate, i.e., without reducing the bandwidth, can allow the messages to be displayed substantially in real time and provide real-time two-way interaction between the messaging device and the remote unit with respect to the status and other important display parameters. It can also greatly enhance features such as animation, scrolling, sound, etc.

In the prior art visual messaging devices, particularly those that use high current consuming elements, such as LEDs, the remote units either transmit data at a lower rate or they first substantially reduce the received data rate, usually to about 10K bauds/second. Such devices are inefficient in the use of the transmitted data, do not provide the substantially real-time display or real-time two-way interaction between the visual display device and the remote unit and thus significantly reduce the effect of display features and also severely limit the information that is communicated back to the remote unit.

The present invention provides a display messaging system wherein the visual display messaging device displays the messages substantially in real time and may communicate or interface with the remote unit.

Another disadvantage of prior art visual messaging devices is the limitation faced during indoor use and installation. Users of visual messaging devices typically seek a visual display unit having a sleek, thin design. However, power supplies incorporated in the visual display units impose their size on the overall dimensions of the visual display units resulting in relatively large and bulky units.

In order to maintain the visual display unit's thin design, some prior art visual messaging devices have utilized power supplies positioned in a remote location relative to the visual display unit. These power supplies convert a line AC voltage to a low DC voltage, typically 12 volts or less which is required for energizing the visual display unit. However, this configuration has its drawbacks because large, expensive cabling is required between the visual display unit and remote power supply in order to provide sufficient current and voltage to the visual display unit. For example, visual display units comprising multiple LEDs in a matrix require a relatively high current for illumination of the LEDs compared to other display light sources. Therefore, large, expensive cabling is required in order to remotely locate the power supply at any appreciable distance.

Still another drawback is the additional installation expense faced by users of prior art visual messaging devices lacking a remote power source for the visual display unit. A typical indoor commercial installation configuration includes a 110/220 VAC power source wired directly to the visual display unit. Wiring or cabling for the power supply is typically run through a concealed passage, such as an office building's plenum air space, to the visual display unit LEDs. However, for safety purposes, restrictions exist in placing high voltage wires in a plenum air space. For example, all wiring in excess of 50 volts to ground must be placed within conduit prior to installation in plenum air spaces. Therefore, the wiring or cabling for the power supply to the visual display unit not only becomes large and bulky, but in most circumstances requires professional installation in order to meet the proper safety codes for indoor installation.

The present invention provides a visual display messaging device having a remote electrical supply system for visual messaging device electrical components, preferably high current devices, including, visual display units, which addresses these and other drawbacks of prior art devices.

SUMMARY OF THE INVENTION

A preferred embodiment of the present invention features a visual messaging device for use with a high-speed network. The message data is communicated to the network by a remote device, such as a computer or server. The visual messaging device includes a network interface circuit that receives the message data from the network and arranges it in a memory unit in usable form (packets) for use by a processor at the high network speed. The visual messaging device includes a central processing unit ("CPU"), a multitasking device, which sequences the messages in real time for display according to programmed instructions stored or provided to the visual messaging device. A display driver activates and deactivates the visual elements, such as individual LEDs, according to the processor's instructions. The various elements of the visual messaging device communicate in real time over a common data bus. The network may be a local network, wide area network, wireless network or the Internet.

Memory is managed such that a first memory and second memory work together to store the available messages in a selected format for use by the processor and another memory, or third memory, stores programs or programmed instructions.

A common data bus provides two-way communications link among the processor, memories, network interface and the display driver. The processor may provide status reports of the messages to the remote unit at the network speed, i.e., effectively in real time. Such status may include the (i) current message on the display; (ii) configuration of the message displayed by the display device; (iii) message to be displayed; and (iv) time sequence of messages.

In another embodiment, an electrical supply system provides power to the visual messaging device. The electrical supply system comprises a power source located in a remote location relative to the visual messaging deice, which may be several feet or several hundred feet from the power source. The remote power source is able to convert an AC line voltage to a first DC voltage which may be transmitted to the visual messaging device, preferably the visual display unit, via relatively thin wiring or cabling passing through an enclosure, such as a plenum air space, without the need of placing the wiring or cabling in a conduit. Upon transmission of the first DC voltage to the visual messaging device, at least one DC-DC converter, either internal or external to the visual display unit, is utilized to step down the first DC voltage to at least one second DC voltage suitable for various components in the visual messaging device, including, but not limited to, light-emitting sources in the visual display unit.

In yet another embodiment, an alternative electrical supply system provides power to the visual messaging device. The electrical supply system comprises a power source located in a remote location relative to the visual messaging device. The remote power source is able to convert a first AC line voltage to a second AC voltage which may be transmitted to the visual messaging device, preferably the visual display unit, via relatively thin wiring or cabling passing through an enclosure, such as a plenum air space, without the need of placing the wiring or cabling in a conduit. Upon transmission of the second AC voltage to the visual messaging device, at least one AC-DC converter, either internal or external to the visual display unit, is utilized to convert and step down the second AC voltage to at least one first DC voltage suitable for various components in the visual messaging device, including, but not limited to, light-emitting sources in the visual display unit.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DESCRIPTION OF THE PREFERRED EMBODIMENT

Figure 1:
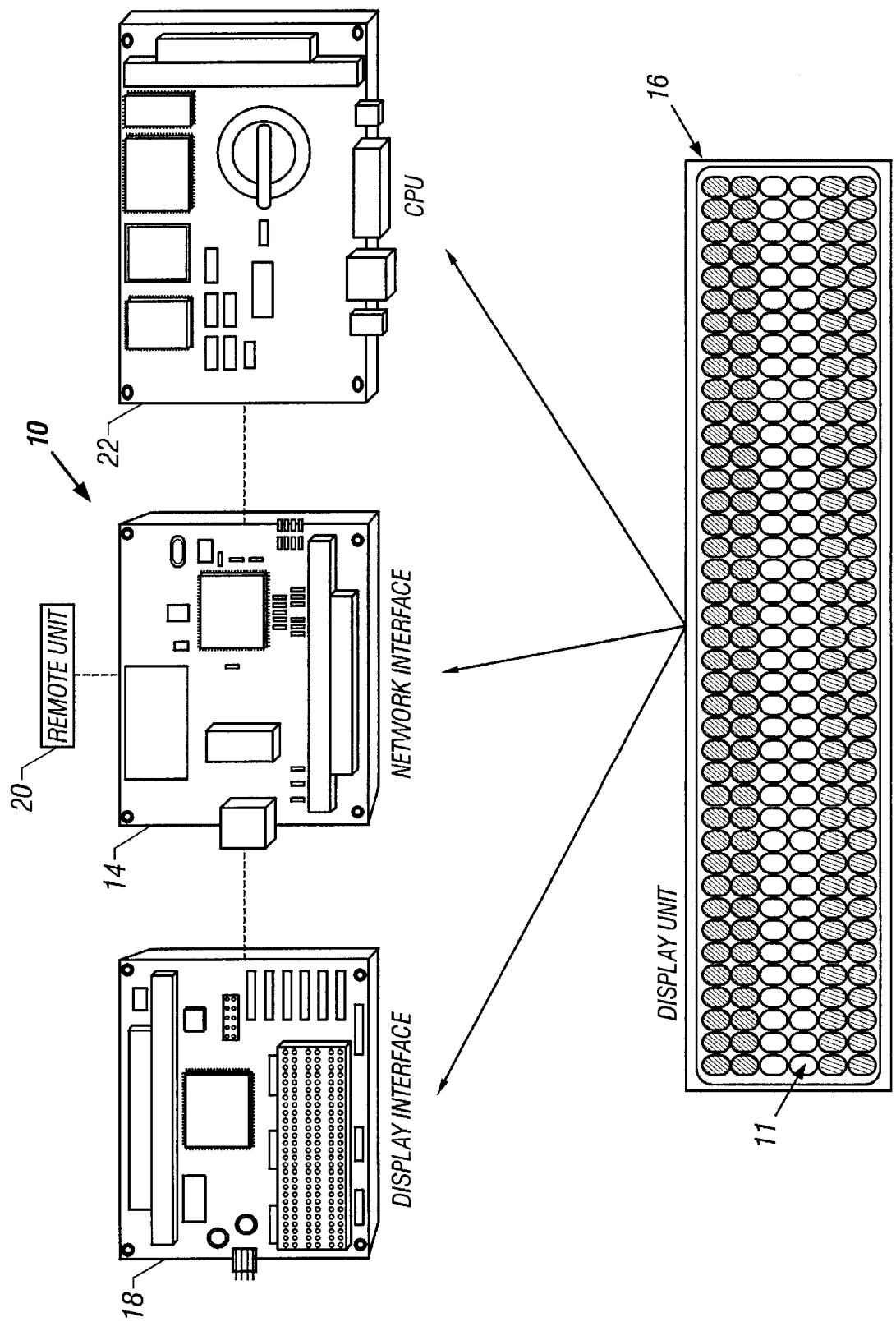
FIG. 1 shows one embodiment comprising certain hardware pieces that make up the visual messaging device of the present invention.

FIG. 1 illustrates generally the main hardware assemblies included in a visual messaging device 10 according to one embodiment of the present invention. The visual messaging device 10 is preferably an integrated unit comprising modular assemblies that include: one or more display units, such as a unit 16 containing a matrix of light-emitting diodes 11 for displaying the visual messages in the desired format and sequence; a network interface 14 for interfacing with the high-speed network and for providing the message data to the device at the high-speed data rate; a display interface or driver 18 for the driving or activating and deactivating the display unit 16; and a central processing unit 22 (also referred to herein as the processor or controller) for processing message data received from a remote unit 20 over the high-speed network in real time and for controlling the operation of the various elements of the visual messaging device 10.

Figure 2:
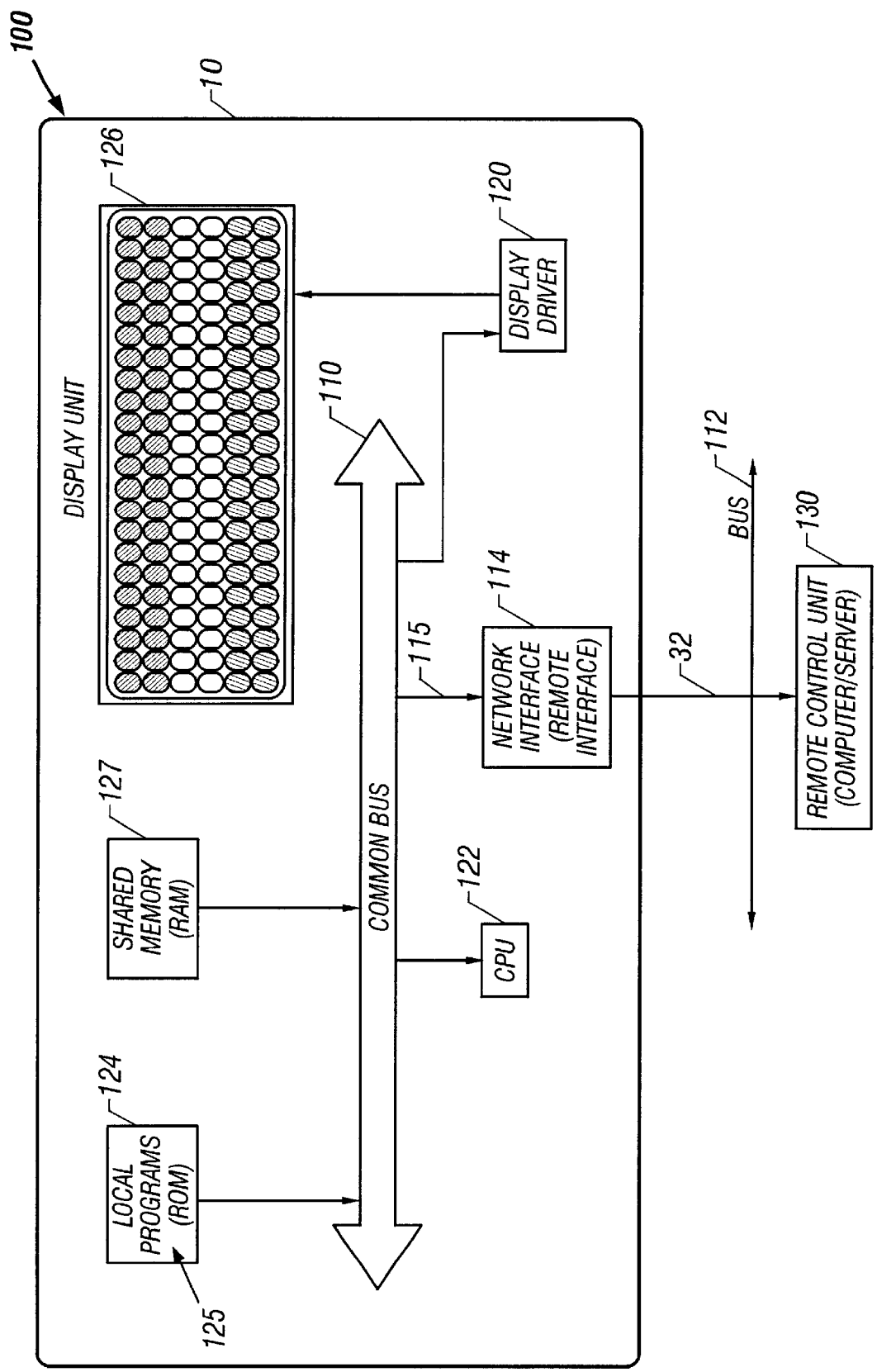
FIG. 2 is a functional block diagram of the visual messaging device of the present invention.

FIG. 2 shows a block functional diagram of a visual messaging display system 100 in more detail. The visual messaging display system 100 includes a visual messaging display device 10 and a remote unit 130, such as a computer or server suitable for two-way communication over a high-speed network 112, such as a local area network ("LAN"), wide area network or the Internet. The remote unit 130 provides to the high-speed network 112 messages to be displayed and other information and control signals at high data rates, typically in excess of 1 megabits per second. This data rate however, in many cases, may be much greater than 1 megabits/second. In the system 100, the visual messaging device 10 includes a network interface circuit or unit 114, preferably in the form of a circuit board or a plugable module. The network interface circuit 114 is operatively coupled to the network 112 via a line 32 and is adapted to provide two-way communication with the remote unit 130 over the network 112. The visual messaging device 10 further includes a central processor 122 (or processor), one or more memory.units 124 for storing programs for the use of the central processor 122, a memory 127 for storing data for use by the processor 122, a display driver 120 that interfaces with the visual display 126. For the purpose of this invention, any suitable visual display device may be utilized, including a light-emitting diode ("LED") device, a liquid crystal device ("LCD"), an optical fiber display device, and a cathode ray tube ("CRT"). Such devices are commercially available. The display driver is configured or designed to operate the type of the display device selected for a particular application. In one embodiment, the visual display 126 preferably contains multiple LEDS comprising at least a red LED and/or a green LED and/or a blue LED arranged in a matrix, with each such LED adapted to be independently activated and deactivated by the display driver 120. The various elements of the messaging device 10 communicate with each other over a common bus 110 which is operatively coupled to each such device.

During operation, the rerriote unit 130 provides the necessary information about the messages to be displayed over the network 112 at a wide bandwidth (i.e. high data rate that generally exceeds 1 megabits/second). The network interface circuit or unit 114 receives this data and stores in packets in a predetermined order in one bank of the shared memory 127. Shared memory units, such as memory 127, allows the central processor 122 to use and manipulate data stored in one segment of the memory 127 while allowing the network circuit 114 to store data in a second segment of the memory 127. The display driver 120 and the processor 122 can also look at the same data. The network interface circuit 114 preferably utilizes a single network chip set, such as ethernet chip AMD 79C961 made by AMD Corporation, or a similar device. However, any suitable real-time network interface may be utilized for the purpose of this invention.

The programs 125 (also referred to herein as "the programmed instructions") for use by the central processor 122 are stored in the memory 124, which may be in the form of a read-only memory ("ROM"), erasable programmable ROM ("EPROM"), electrically erasable programmable ROM ("EEPROM") or other similar device. The programs 125 may be preloaded in the visual messaging device 10 and/or downloaded from the network 112. The stored programs may be altered by the processor 122 upon receiving instructions from the remote unit 130. The central processor 122 retrieves the stored data from the shared memory 127, manipulates that data according to one or more programs 125 stored in the memory 124 and makes it available, in the form of bit maps, for example, for use by the display driver 120 for activating and deactivating the LEDs of the visual display 126.

The network interface circuit 114 makes available to the memory 127 the message data received from the remote unit 130 substantially in real time over the bus 110. The processor 122 executes multiple tasks with respect to the message data. It retrieves the bit packets, assemble messages (some messages taking more than one such packet), sequences the messages in order of the desired or selected priority and stores such messages in the shared memory 127. It also manages the execution of the messages by the display driver 120. For example, for a message that is desired to be scrolled on a LED type visual display 126, the processor 122 builds messages in the form that can be executed on such a display device, instructs the display driver 120 as to which particular LEDs are to be activated and deactivated and their respective timing.

The display driver 120 operates upon the instructions of the processor 122 and activates and deactivates the LEDs in the instructed order. The speed at which the messages can be displayed and altered is limited by the display device speed. However, compared to the commercially available devices, the display device 10 can display messages, such as letters, numbers, animations and sounds as close to the real time as the display device will allow. In the visual messaging device 10, the network interface circuit stores the message data in the buffer in packets without reducing the bandwidth of the high-speed network. The processor manipulates the received data and manages the display of the received messages on the display device. The processor 122 and the display driver 120 have access to the data to be displayed at substantially the same time. The processor 122, memory 127, network interface unit 114 and the display drive 120 communicate over a common data bus 110. This combination allows the device 10 to deliver the message data to the visual display 126 at the high-speed network bandwidth, which is of a greater magnitude than the current products that use serial links between the network 114 and the display devices.

The processor may communicate in real time various parameters or status reports of the messages to the remote unit 130 via the network interface 114 at the network data speed. The status reports may include the message on the display device, the configuration of the message displayed, next message, time sequence of messages, scrolling information and any other status information. The visual messaging device 10 preferably is an integrated device, in that, the network circuit, processor, display driver and the other elements described above form a single unit.

Figure 3:
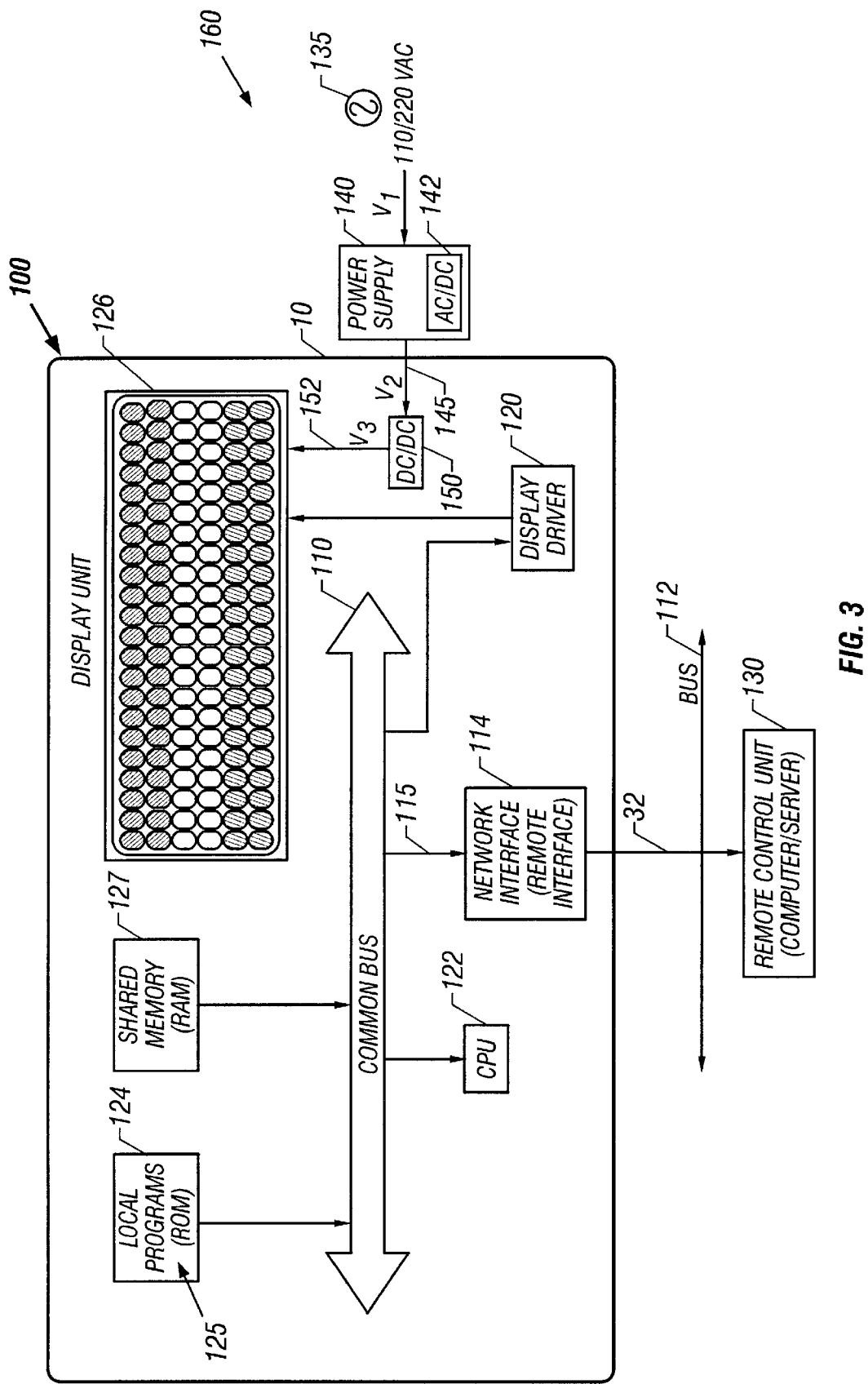
FIG. 3 is a functional block diagram of the visual messaging device in FIG. 2, including an electrical supply system for providing power to a high current visual display unit.

Referring to FIG. 3, electrical supply system 160 comprises, in part, power supply 140 and DC-DC converter 150 which provide power to various visual messaging device electrical components, preferably low DC voltage, high current carrying or consuming devices, including, for example, visual display unit 126. As stated before, visual display unit 126 may comprise an LED device, including a plurality of LEDs arranged in an array, a gas plasma display, an LCD device, an optical fiber display device or a CRT.

A first AC voltage ($V_1$), typically 110/220 VAC, is generated by a source of alternating current 135 at a remote location relative to the visual messaging device 100. This source of alternating current preferably is a line voltage supply accessible through an electrical outlet or, alternatively, a portable electrical source such as an electrical generator.

The first AC voltage is applied to power supply 140, which is typically located at a remote location from the visual messaging device 100 and the visual display unit 126. Within power supply 140 is a AC to DC converter 142. AC to DC converter 142 converts the first AC voltage to a first DC voltage ($V_2$) for utilization by DC devices or transmission of the first DC voltage through areas where safety codes or restrictions prohibit use or transmission of high voltages, for example, voltages greater than 50 volts. For transmission purposes, AC to DC converter 142 will convert and step the voltage down from 110/220 volts to a voltage that is slightly less than a restricted voltage for the specific enclosure, but will maintain a large enough voltage that any voltage drop across the wiring or cabling used in the transmission of electrical energy from power supply 140 to visual display unit 126 or other devices will be negligible. For example, tests of electrical supply system 160 showed an insignificant voltage drop at the input of visual display unit 126 when using a remote 110/220 VAC source, converting to 48 VDC and transmitting the 48 VDC over 300 feet of 16 gauge wire. It should be noted that with the present electrical supply system 160 a voltage range between about 5 volts to a value approaching 60 volts has been found to be acceptable for transmission purposes.

Following conversion of the first AC voltage to the first DC voltage, the first DC voltage is transmitted via wire or cable 145 to a DC to DC converter 150 where the first DC voltage is converted to a second DC voltage ($V_3$), which is supplied via wire or cable 152 to the visual messaging device 100, including visual display unit 126. While the second DC voltage is preferably used by the visual display unit 126, the second DC voltage may be used by any electrical component in the visual messaging device 100. Use of the relatively thin wire or cable 145 in the transmission of power to the DC to DC converter 150, and ultimately the visual display unit 126, is easier to work with because it need not be enclosed in conduit, it is lightweight and encompasses less volume, provides for better connectivity and is far more inexpensive compared to the large, bulky wiring or cabling used in the prior art systems. Most visual display units utilizing a plurality of LEDs arranged in an array require 5 or 12 VDC to drive the individual LEDs. However, preferably the second DC voltage is within a range between about less than 1 volt to a value approaching or equaling 30 volts. DC to DC converter 150 may be placed adjacent to or, preferably, within visual display unit 126.

Figure 4:
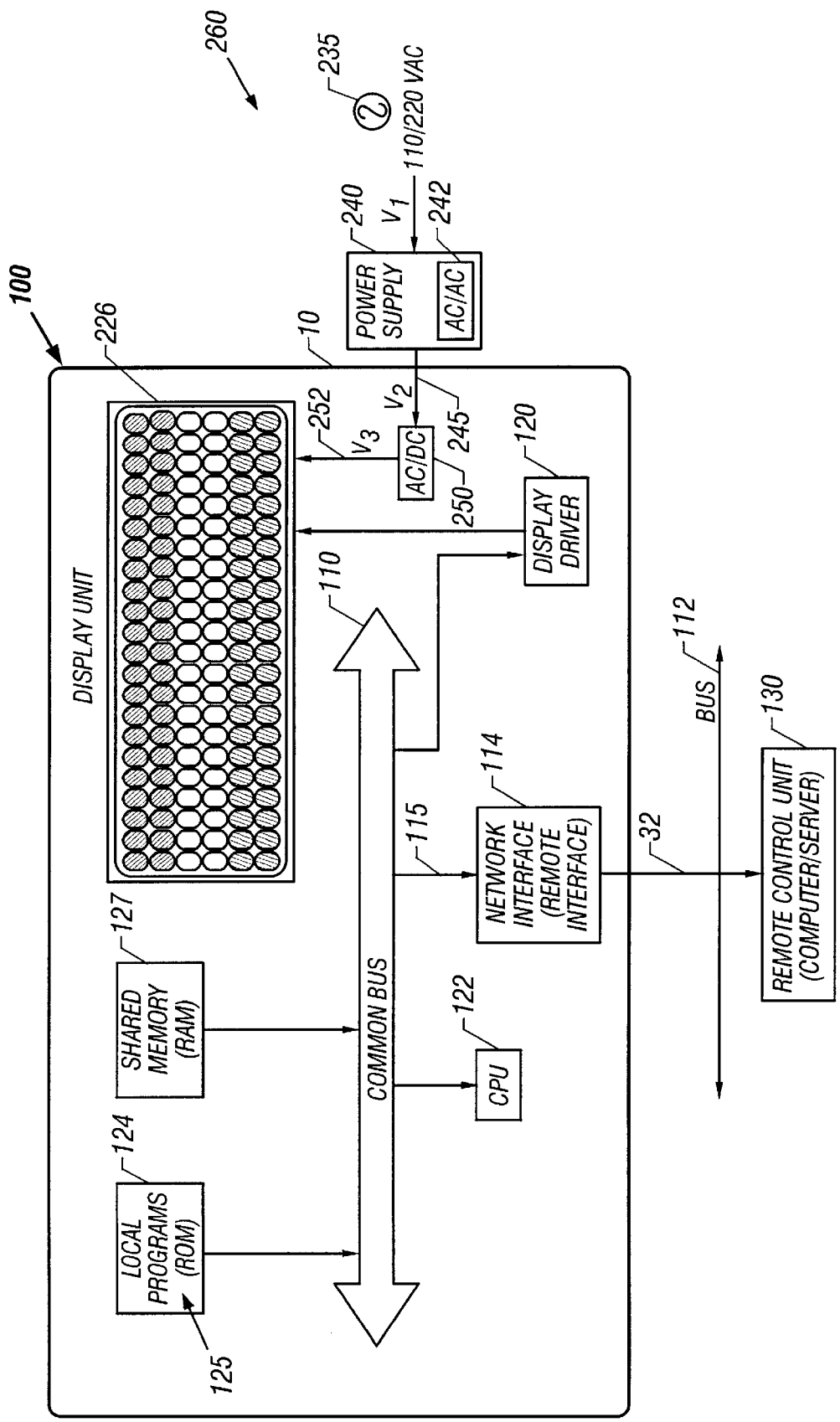
FIG. 4 is a functional block diagram of the visual messaging device in FIG. 2, including an alternative embodiment of the electrical supply system for providing power to a high current visual display unit.

In another embodiment, illustrated in FIG. 4, electrical supply system 260 comprises, in part, power supply 240 and AC-DC converter 250 which provide power to various visual messaging device electrical components, preferably low DC voltage, high current carrying or consuming devices, including, for example, visual display unit 226. As stated before, visual display unit 226 may comprise an LED device, including a plurality of LEDs arranged in an array, a gas plasma display, an LCD device, an optical fiber display device or a CRT.

A first AC voltage ($V_1$), typically 110/220 VAC, is generated by a source of alternating current 235 at a remote location relative to the visual messaging device 100. This source of alternating current preferably is a line voltage supply accessible through an electrical outlet or, alternatively, a portable electrical source such as an electrical generator.

The first AC voltage is applied to power supply 240, which is typically located at a remote location from the visual messaging device 100 and visual display unit 226. Within power supply 240 is an AC to AC converter 242. AC to AC converter 242 converts the first AC voltage to a second AC voltage ($V_2$) for transmission of the second AC voltage through areas where safety codes or restrictions prohibit use or transmission of high voltages, for example, voltages greater than 50 volts. For transmission purposes, AC to AC converter 242 will step the voltage down from 110/220 volts to a voltage that is slightly less than a restricted voltage for the specific enclosure, but will maintain a high enough voltage that any voltage drop across the wiring or cabling used in the transmission of electrical energy from power supply 240 to visual display unit 226 or other devices will be negligible. For example, tests of electrical supply system 260 show an insignificant voltage drop at the input of visual display unit 226 when using a remote 110/220 VAC source, stepping the voltage down to 48 VAC and transmitting the 48 VAC over 300 feet of 16 gauge wire. It should be noted that with the present electrical supply system 260, a voltage range between about 5 volts to a value approaching 60 volts has been found to be acceptable for transmission purposes.

Following conversion of the first AC voltage to the second AC voltage, the second AC voltage is transmitted via wire or cable 245 to a AC to DC converter 250 where the second AC voltage is converted to a first DC voltage ($V_3$), which is supplied via wire or cable 252 to the visual messaging device 100, including visual display unit 226. While the first DC voltage is preferably used by the visual display unit 226, the first DC voltage may be used by any electrical component in the visual messaging device 100. Use of the relatively thin wire or cable 245 in the transmission of power to the AC to DC converter 250, and ultimately the visual display unit 226, is easier to work with because it need not be enclosed in conduit, it is lightweight and encompasses less volume, provides for better connectivity and is far more inexpensive compared to the large, bulky wiring or cabling used in the prior art systems. Most visual display units utilizing a plurality of LEDs arranged in an array require 5 or 12 VDC to drive the individual LEDs. However, preferably the first DC voltage is within a range between about less than 1 volt to a value approaching or equaling 30 volts. AC to DC converter 250 may be placed adjacent to or, preferably, within visual display unit 226.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An electrical supply system for providing power to a visual messaging device, said system comprising:
    (a) a relatively low direct current (DC) voltage, high current low profile display device;
    (b) a source of alternating current (AC) at a remote location from said relatively low direct current voltage, high current device for providing a first AC voltage;
    (c) an AC to DC converter at a remote location from said relatively low direct current voltage, high current low profile display device for converting said first AC voltage from said AC source to a first DC voltage;
    (d) a wire of maximum thickness 16 gauge up to 300 feet long for transmitting the first DC voltage substantially without loss and without the need for a conduit surrounding the wire to the high current low profile display device; and
    (e) a DC to DC converter incorporated within said relatively low direct current voltage, high current low profile display device for converting said first DC voltage to a second DC voltage and supplying said second DC voltage to said relatively low direct current voltage, high current device.

2. The system of claim 1 wherein said relatively low direct current voltage, high current device is a light-emitting diode (LED) display having a plurality of LEDs arranged in an array.

3. The system of claim 1 wherein said relatively low direct current voltage, high current device is a plasma display.

4. The system of claim 1 wherein said first DC voltage is within a range of voltages of 5 to 60 volts.

5. The system of claim 1 wherein said second DC voltage is within a range of voltages of less than 1 to 30 volts.

6. An electrical supply system for providing power to a visual messaging device, said system comprising:
    (a) a relatively low direct current (DC) voltage, high current low profile display device;
    (b) a source of alternating current (AC) at a remote location from said relatively low direct current voltage, high current device for providing a first AC voltage;
    (c) a AC to AC converter at a remote location from said relatively low direct current voltage, high current low profile display device for converting said first AC voltage from said AC source to a second AC voltage;
    (d) a wire of maximum thickness 16 gauge up to 300 feet long for transmitting the second AC voltage substantially without loss and without the need for a conduit surrounding the wire to the high current low profile display device; and
    (e) a AC to DC converter adjacent said relatively low direct current voltage, high current device for converting said second AC voltage to a first DC voltage and supplying said first DC voltage to said relatively low direct current voltage, high current low profile display device.

7. The system of claim 6 wherein said relatively low direct current voltage, high current device is a light-emitting diode (LED) display having a plurality of LEDs arranged in an array.

8. The system of claim 6 wherein said relatively low direct current voltage, high current device is a plasma display.

9. The system of claim 6 wherein said second AC voltage is within a range of voltages of 5 to 60 volts.

10. The system of claim 6 wherein said first DC voltage is within a range of voltages of less than 1 to 30 volts.

11. An electrical supply system for providing power to a visual messaging device, said system comprising:

(a) an electrical component within the visual messaging device;

(b) a source of alternating current (AC) at a remote location from said electrical component for providing a first AC voltage;

(c) an AC to DC converter at a remote location from said electrical component for converting said first AC voltage from said AC source to a first DC voltage;

(d) a wire of maximum thickness 16 gauge up to 300 feet long for transmitting the first DC voltage substantially without loss and without the need for a conduit surrounding the wire to the high current low profile display device; and (e) a DC to DC converter adjacent incorporated within said visual display device for converting said first DC voltage to a second DC voltage and supplying said second DC voltage to said electrical component.

12. An electrical supply system for providing power to a visual messaging device, said system comprising:

(a) an electrical component within the visual messaging device;

(b) a source of alternating current (AC) at a remote location from said electrical component for providing a first AC voltage;

(c) an AC to AC converter at a remote location from said electrical component for converting said first AC voltage from said AC source to a second AC voltage;

(d) a wire of maximum thickness 16 gauge up to 300 feet long for transmitting the second AC voltage substantially without loss and without the need for a conduit surrounding the wire to the high current low profile display device; and (e) an AC to DC converter adjacent said electrical component for converting said second AC voltage to a first DC voltage and supplying said first DC voltage to said electrical component.

\* \* \* \* \*